US010090006B2

(12) United States Patent
Thomas

(10) Patent No.: US 10,090,006 B2
(45) Date of Patent: Oct. 2, 2018

(54) ELECTROMECHANICAL SYSTEM AND METHOD OF ACTUATING A STYLUS

(71) Applicant: Ted Thomas, Bedford, NH (US)

(72) Inventor: Ted Thomas, Bedford, NH (US)

(*) Notice: Subject to any disclaimer, the term of this patent is extended or adjusted under 35 U.S.C. 154(b) by 0 days.

(21) Appl. No.: 15/954,828

(22) Filed: Apr. 17, 2018

(65) Prior Publication Data
US 2018/0254057 A1    Sep. 6, 2018

Related U.S. Application Data

(63) Continuation of application No. 15/483,797, filed on Apr. 10, 2017, now Pat. No. 9,966,090.

(60) Provisional application No. 62/449,865, filed on Jan. 24, 2017, provisional application No. 62/323,678, filed on Apr. 16, 2016.

(51) Int. Cl.
*G11B 3/38*    (2006.01)
*G11B 3/00*    (2006.01)
*G11B 9/00*    (2006.01)
*H04R 19/06*    (2006.01)
*G11B 3/46*    (2006.01)

(52) U.S. Cl.
CPC ............... *G11B 3/38* (2013.01); *G11B 3/006* (2013.01); *G11B 3/46* (2013.01); *G11B 9/00* (2013.01); *H04R 19/06* (2013.01)

(58) Field of Classification Search
CPC .. G11B 3/38; G11B 3/006; G11B 3/46; G11B 9/00
USPC .......................................................... 369/220
See application file for complete search history.

(56) References Cited

U.S. PATENT DOCUMENTS 4,771,476 A * 9/1988 Ryback .................... A61B 7/02
381/338

* cited by examiner

*Primary Examiner* — Allen T Cao
(74) *Attorney, Agent, or Firm* — Finch & Maloney PLLC

(57) ABSTRACT

A motion inducing system for playing sounds over a gramophone is provided. An electrical signal such as that from a digital music player is converted to lateral movement of a surface using a linear motion transducer. The lateral movement moves the stylus of a gramophone, and the music from the digital music source is played through the horn of the gramophone.

20 Claims, 11 Drawing Sheets

FIG. 2B
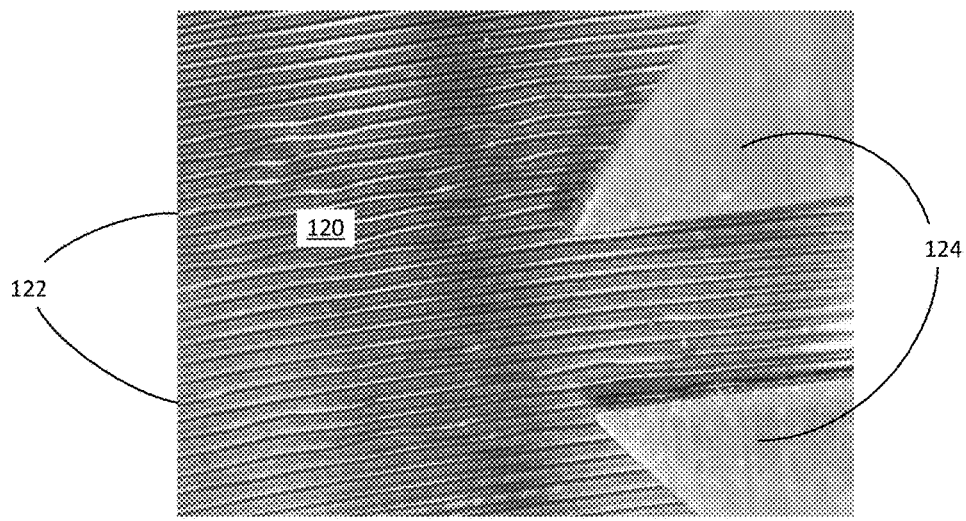
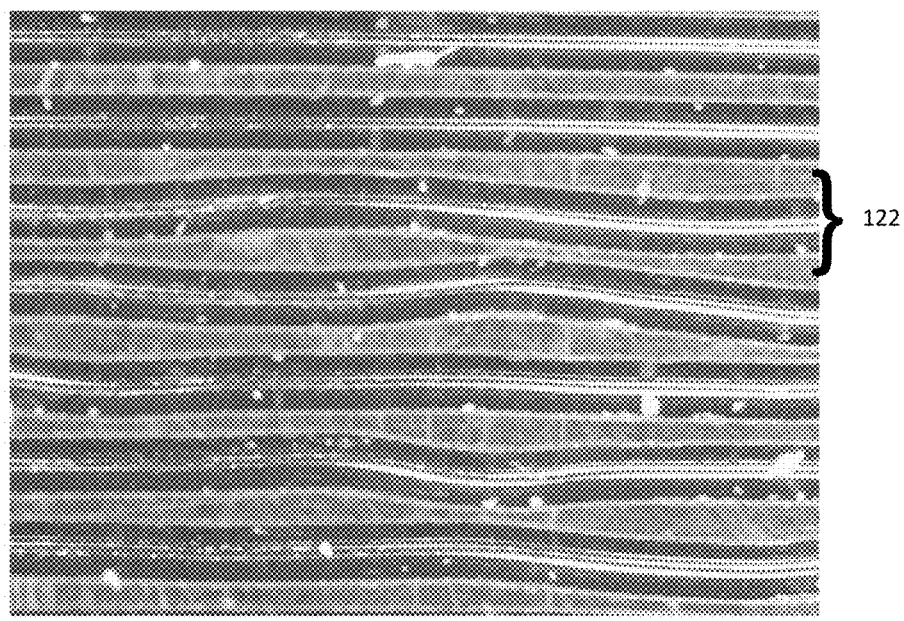
FIG. 2C

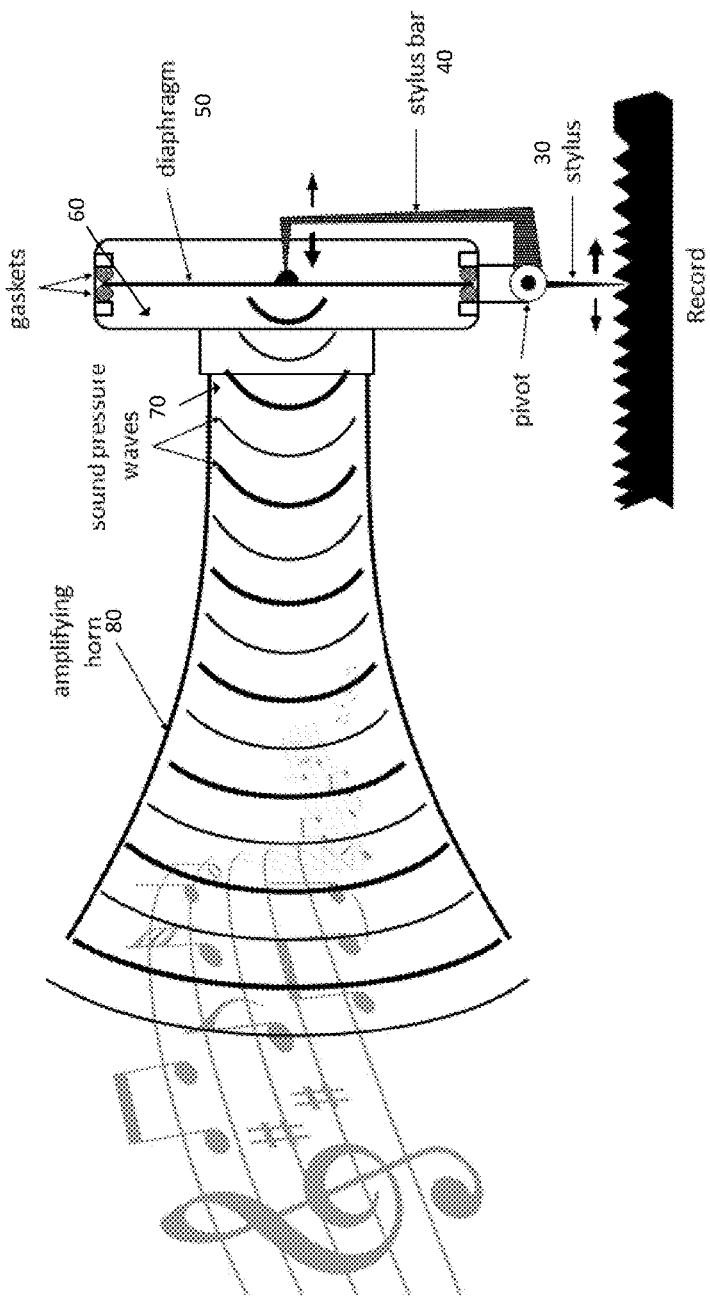

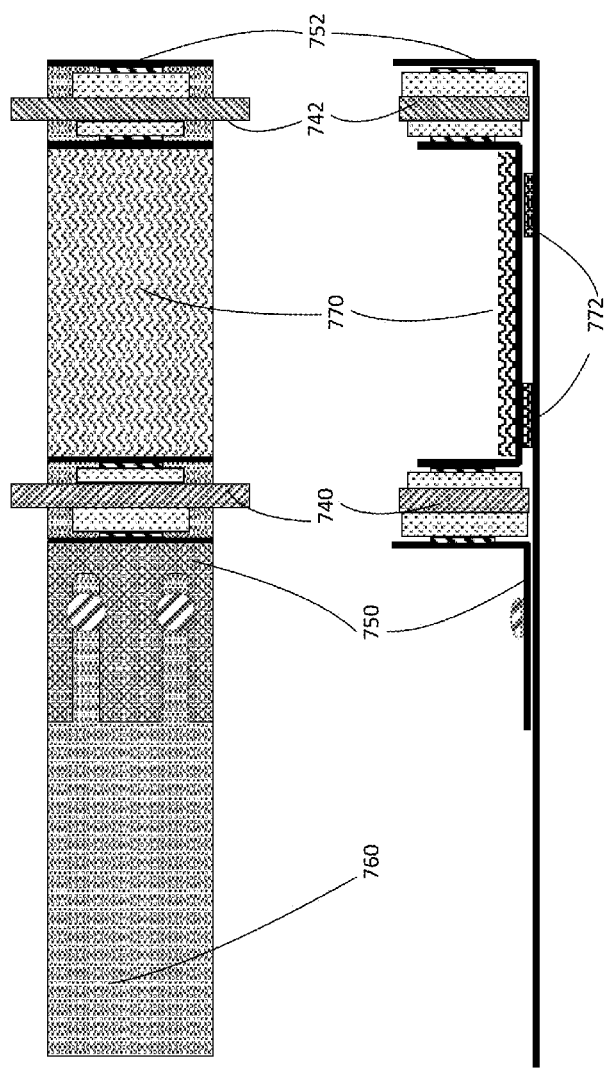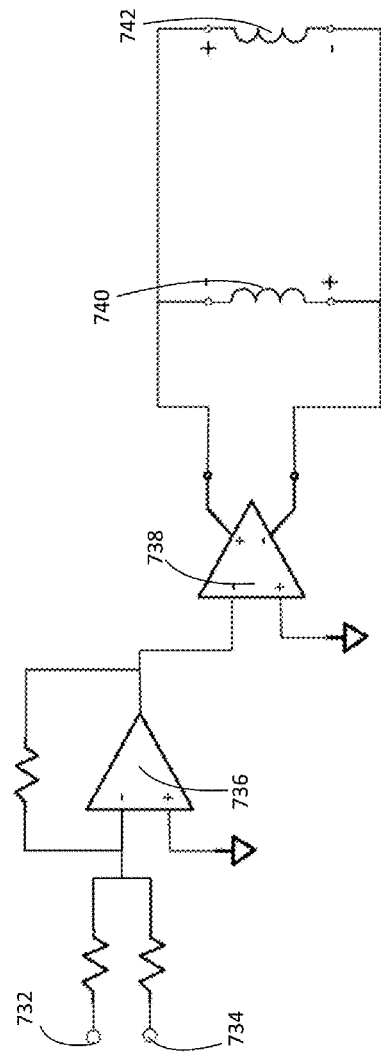
FIG. 7A
FIG. 7B
FIG. 7C

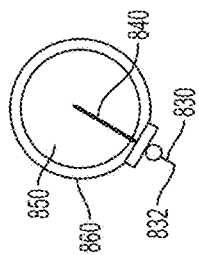
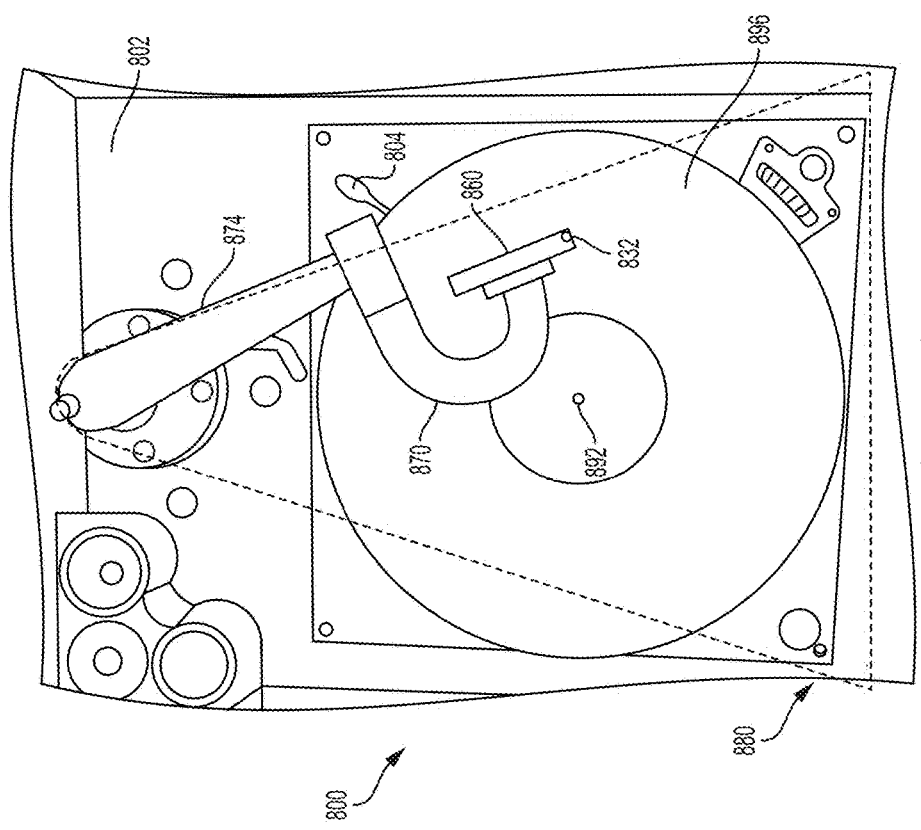

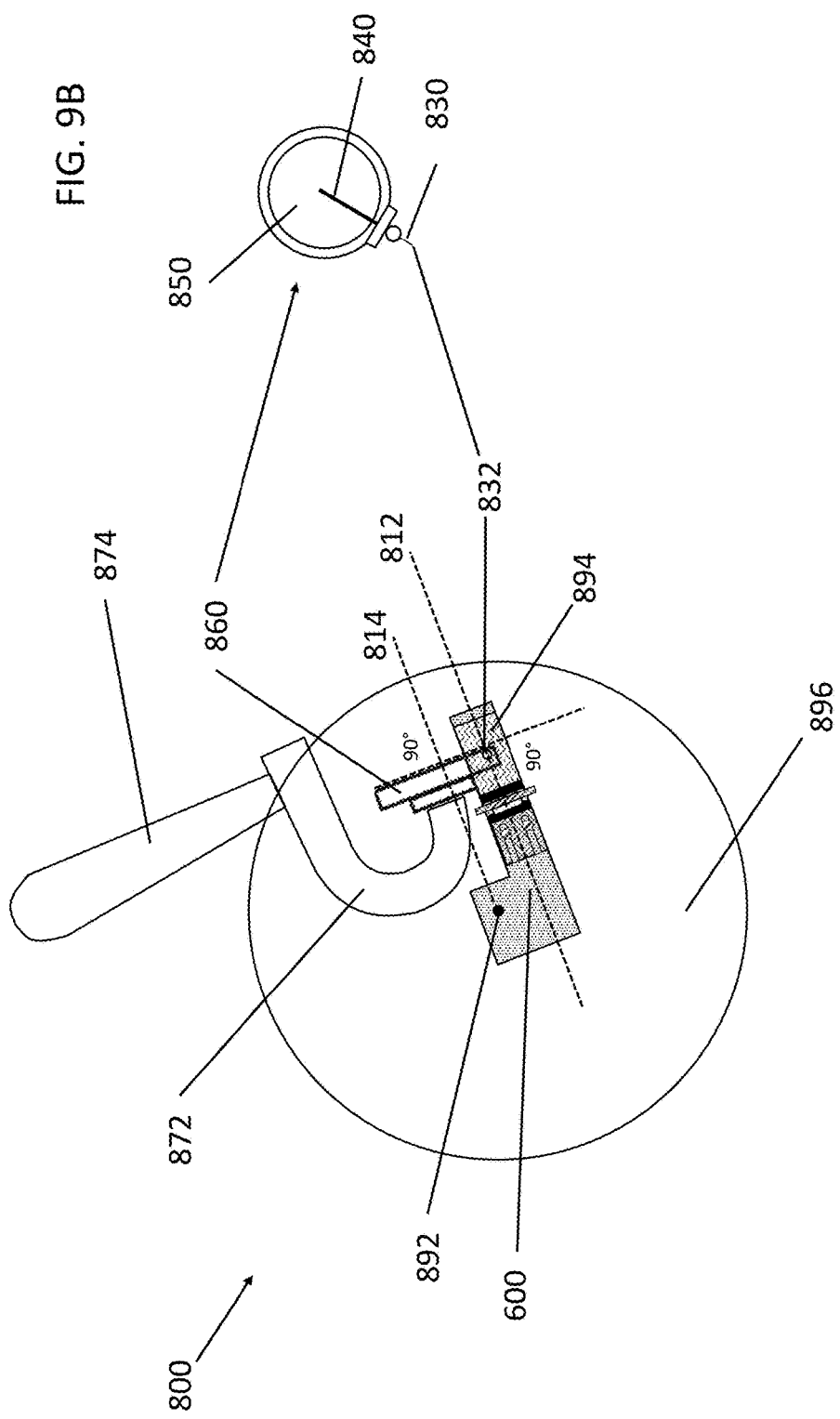

ELECTROMECHANICAL SYSTEM AND METHOD OF ACTUATING A STYLUS

RELATED APPLICATIONS

This Application is a continuation of U.S. patent application Ser. No. 15/483,797 filed on Apr. 10, 2017, which claims the benefit of U.S. Provisional Application Ser. No. 62/449,865 filed Jan. 24, 2017 and U.S. Provisional Application Ser. No. 62/323,678 filed Apr. 16, 2016. Each of these applications are hereby incorporated by reference in their entireties herein.

FIELD

This disclosure relates to systems and devices for converting electronic sound signals to translational motion and, in particular, for playing digitally stored music on a mechanical gramophone.

BACKGROUND

Phonographs produce sound through the mechanical vibration of a stylus. In older phonographs, known as gramophones, sound was produced through a strictly mechanical linkage between the stylus, a diaphragm, and a sound horn. In later versions (after about 1930) an electromagnetic stylus would convert translational or vertical movement to an electrical signal that was amplified to drive a loudspeaker. Different types of electromechanical styli include moving magnet, moving iron and moving coil cartridges. Through the 1940's and 50's mechanical styli were almost entirely replaced by electromagnetic ones.

SUMMARY

In one aspect a device for playing sound over a gramophone is provided, the device comprising at least one linear motion transducer configured and arranged to be driven by an audio signal originating from an audio signal source, a carriage mechanically coupled to the linear motion transducer, the carriage having an upper surface constructed and arranged to contact and retain the tip of a gramophone stylus, and a base for supporting the carriage, the base configured and arranged to allow for lateral movement of the carriage in response to movement of the linear motion transducer. The device can include at least two linear motion transducers, the linear motion transducers coupled to opposing ends of the carriage. The device can include a spindle hole in the base, the spindle hole constructed and arranged to be placed over the spindle of a gramophone and to provide alignment of the carriage with the gramophone stylus. The device can include a power source, an amplifier and a digital music source. Digital music is heard through a mechanical gramophone horn when a sound signal is provided to the device and a gramophone stylus is in physical contact with the surface of the carriage. The carriage of the device can include a surface that defines a recess, such as a groove, for retaining a gramophone stylus. The carriage can be mechanically coupled to a stylus bar on a gramophone. The movement of the carriage may not produce sound perceptible to the human ear when the carriage is not linked to a stylus. The at least one linear motion transducer can be, for example, an audio exciter. The device may include damping support between the base and the carriage, and the device may also have a grommet disposed in the spindle hole.

In another aspect, a method of playing music from a digital music source on an analog gramophone is provided, the method comprising moving a surface laterally in response to an electronic sound signal, moving the tip of a gramophone stylus in contact with the surface in unison with the movement of the surface, vibrating a diaphragm in the sound box of the gramophone via a stylus bar linked to the stylus, and producing air waves with the diaphragm, the air waves reproducing the sound represented by the electronic sound signal. The surface can be moved in an axis that is perpendicular to the axis of the gramophone taper tube, the plane of the gramophone diaphragm, and/or a radius of the gramophone platter. The method may include providing the electronic music signal to a linear motion transducer, conditioning and/or amplifying the electronic music signal, and reproducing sound that has a frequency range of at least 300 Hz and less than 10 kHz.

In another aspect, a method of playing digital music on a gramophone is provided, the method comprising providing a source of digital music, the digital music source in electrical communication with a linear motion transducer, moving the linear motion transducer in response to an electrical music signal from the digital music source, vibrating a gramophone stylus via mechanical linkage with the linear motion transducer, producing sound waves by moving a diaphragm mechanically linked to the stylus, and playing the music over a gramophone horn that is in fluid communication with the diaphragm. The linear motion transducer can be constructed and arranged to move a carriage and the stylus can be in contact with the carriage. The stylus can be a standard gramophone stylus comprising steel and/or tungsten, and the stylus may be positioned normal to the surface of the carriage and need not be affixed to the carriage.

In another aspect, a system is provided, the system comprising a gramophone comprising a stylus, a sound box, a diaphragm and a sound horn, a motion inducing device comprising at least one linear motion transducer configured and arranged to receive an electrical signal from a sound source, and a carriage physically coupled to the at least one linear motion transducer, the carriage in physical contact with the stylus of the gramophone. The system can be configured to move laterally when the linear motion transducer is excited. The system can include at least one of a digital music player, a conditioner and an amplifier. The lateral movement may be perpendicular to the groove of a virtual record positioned on the gramophone as if it were being conventionally played by the gramophone.

In another aspect, a method of playing music on a gramophone is provided, the method comprising contacting a gramophone stylus with a horizontal surface, vibrating the horizontal surface laterally to move the gramophone stylus laterally, vibrating the gramophone diaphragm to produce sound, wherein the horizontal surface does not rotate about its axis. The horizontal surface may be vibrated by a linear motion transducer, and the linear motion transducer may be driven by a sound signal.

BRIEF DESCRIPTION OF THE DRAWINGS

In the drawings, different embodiments of the invention are illustrated in which:

FIGS. 2B and 2C are micrographs of the surface of a 78 rpm record;

FIG. 3 is a schematic diagram explaining how a gramophone plays a record;

FIGS. 7A and 7B provide a top view and a profile view of a second embodiment of a modulation device;

FIG. 7C provides an electrical schematic for the device of FIGS. 7A and 7B;

FIG. 8A provides a top down view of a gramophone;

FIG. 8B provides a profile diagram of one of the components of the gramophone of FIG. 8A;

FIG. 9A provides a top down view of an embodiment of a modulation device seated on a gramophone;

FIG. 9B provides a profile view of one of the components of the gramophone of FIG. 9A;

OVERVIEW

Described herein are several systems and devices for playing an electrical sound signal on a mechanical phonograph. For example, the system can convert the output of a digital music player such as an iPod® or mp3 player to translational motion that moves a stylus in a manner similar to the vibrations induced by a record as the stylus passes along a groove. The vibrating stylus moves the diaphragm in the gramophone soundbox, and the resulting air movement is amplified by the gramophone's conventional geometry and is played as sound through the gramophone horn. The electronic sound signal can be converted to translational movement using a Linear Motion Transducer (LMT). As used herein, an LMT is a device that produces linear motion in response to an electronic sound signal. The motion can exhibit both frequency and amplitude. The motion may be reciprocal and may be over short distances, such as less than 1 mm, less than 0.1 inch or less than 0.05 inch. The motion may be in a single axis and may be horizontal and may be in a direction that is normal to the gramophone stylus or normal to the tangent of a groove on a virtual record on the gramophone. An LMT can be, for example, a linear motor, a linear actuator, a modulator, a transducer or an exciter. The LMT can replicate the horizontal (or vertical) stylus vibrations that are induced when the stylus passes along a record groove.

As a result, a gramophone in combination with an LMT can play music or voice recordings, or live readings or performances, without rotational movement of the platter. Any digital music or voice source can be played using the system, and as the platter does not need to rotate, there is little or no friction or wear to the stylus, that, when playing a conventional record, needs to be replaced frequently. Although gramophones and digital music may be at opposite ends of the recorded sound technical timeline, the systems and methods described herein can provide for a melding of the two technologies, even though they may be separated by over 100 years of audio development.

Figure 1:
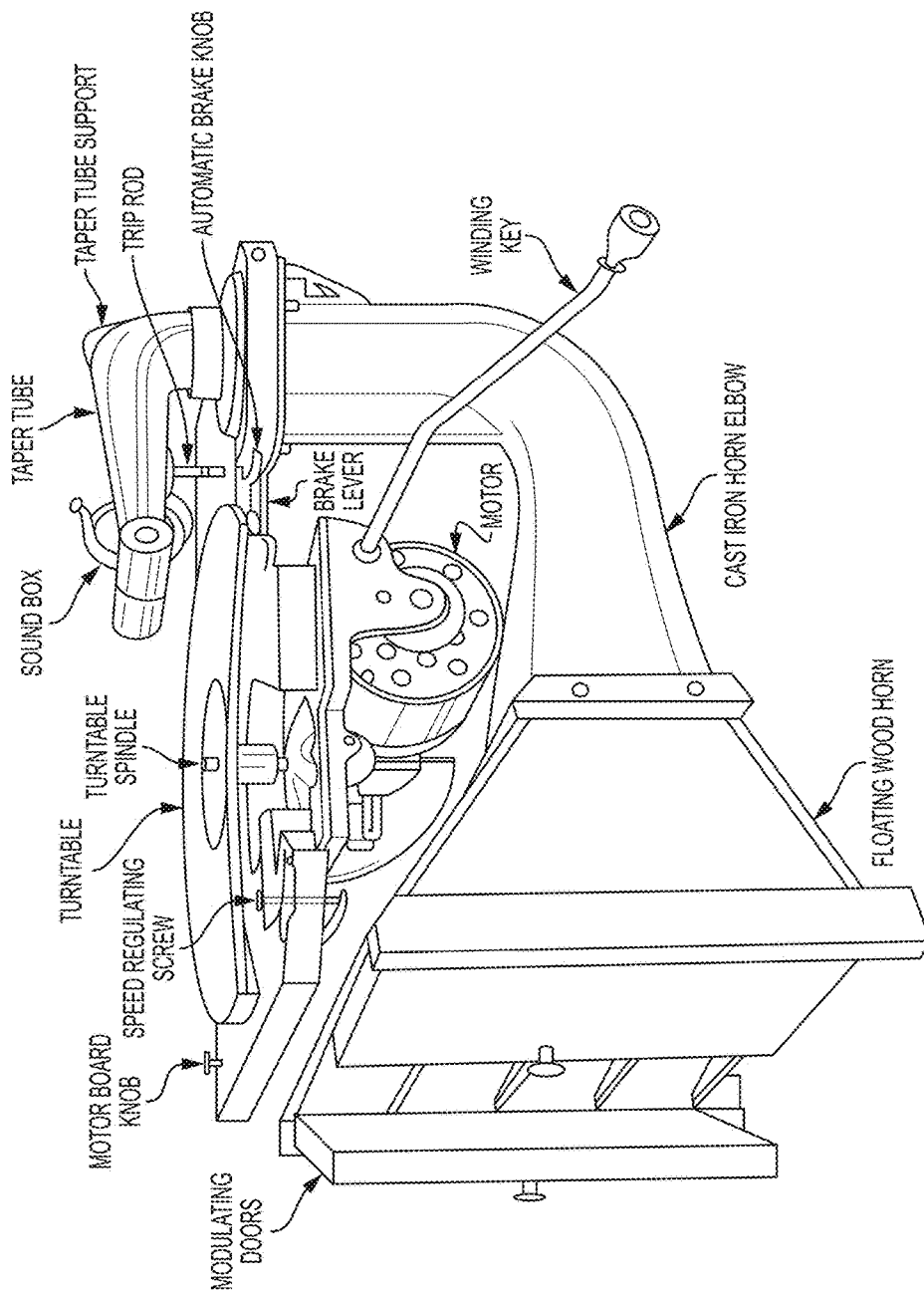
FIG. 1 shows a perspective view of a mechanically powered gramophone.
Figure 2A:
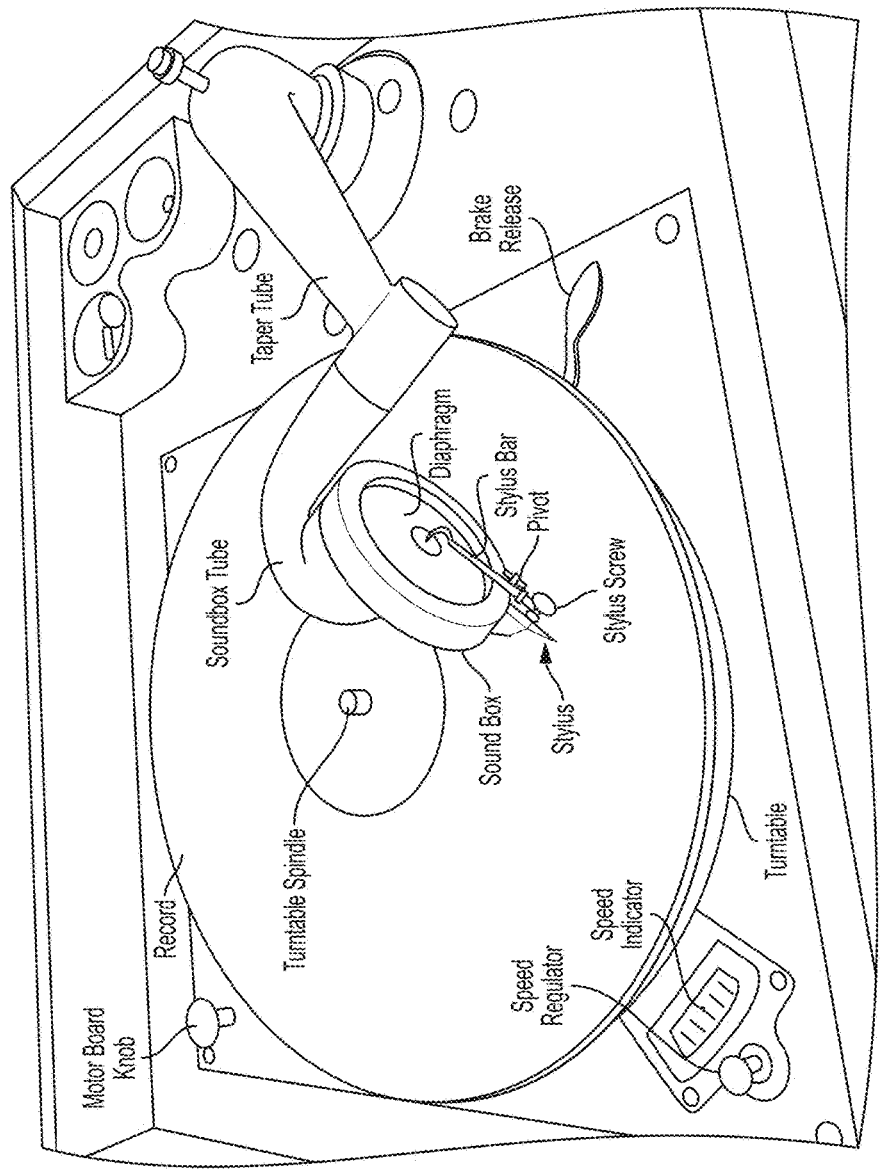
FIG. 2A illustrates a portion of a gramophone.

Record players, also referred to as gramophones, phonographs and turntables, reproduce sound by vibrating a stylus that follows a recorded groove in a record. Most modern systems use an electronic stylus such as a moving magnet or moving coil cartridge. Older phonographs, referred to frequently as gramophones or by the trademark Victrola, rely on a non-electronic, purely mechanical, means of converting recorded music into sound. FIG. 1 illustrates an antique gramophone that is mechanically powered and uses no electricity. FIG. 2A provides a closer view of some of the important components of an antique gramophone. As the stylus of a gramophone rides along the groove in a record, horizontal cuts in the groove move the stylus back and forth. (In some cases, the cuts are vertically oriented and the stylus is moved up and down.) As schematically provided in FIG. 3, the horizontally movement of stylus 30 is amplified by stylus bar 40 which is connected to diaphragm 50 in soundbox 60. Note that as configured, the diaphragm can be both pushed and pulled by the arm. The resulting sound pressure waves are transmitted through soundbox tube 70, taper tube 72 and horn 80 (see FIG. 2A). Proper geometric design of these elements leads to amplification of the sound that is played through the horn. Although the systems described herein can be used with electronic and non-electronic styli, many of the embodiments described herein will refer to non-electronic systems. The same theories and processes can be applied to systems including electrically amplified systems. Although it is believed that the systems described herein will be most frequently used to play music, it is understood that any sound signal can be played over a gramophone, including sound from sources such as local or remote microphones, audio recordings, movie soundtracks, live radio, television audio and online audio feeds, either streaming or stored. Sound sources can be wired to the modulation system or can be in wireless communication with the modulation system, such as via Bluetooth, wifi or other wireless protocol.

FIGS. 2B and 2C provide micrographs of the surface of a 78 rpm record. In FIG. 2B, record 120 includes grooves 122. Caliper jaws 124 are set at 0.1 inch and show that for this type of record, there are about 10 grooves per 0.1 inch or 100 grooves per inch. Each groove is therefore about 0.01 inch wide and includes, at the upper surface, about 0.006 inch of groove width and about 0.004 inch of groove wall. FIG. 2C is magnified enough to show the lateral modulations that were made in the record during recording or pressing. These modulations measure up to about +/−0.002 inch or about +/−50 μm.

The systems described herein can utilize all of the mechanical features of a gramophone, such as a Victrola, from the stylus to the horn. Instead of using a rotating record with cut grooves to move the stylus, the systems and devices described herein use an analog sound signal to move a carriage back and forth horizontally. The carriage can be in direct contact with the stylus of the gramophone and in turn moves the stylus back and forth to replicate the sound that is carried by the electrical signal to the LMT. Most phonographs, including gramophones, use either a manually wound spring or an electric motor to rotate the platter. As the systems used herein can be implemented without rotating the platter, they can be used with a Victrola or other system without a need for the drive system to be engaged or even functional. Thus, music can be played through the gramophone by lateral vibration of the stylus but in the absence of a rotational or longitudinal movement of a record in relation to the stylus.

Figure 4:
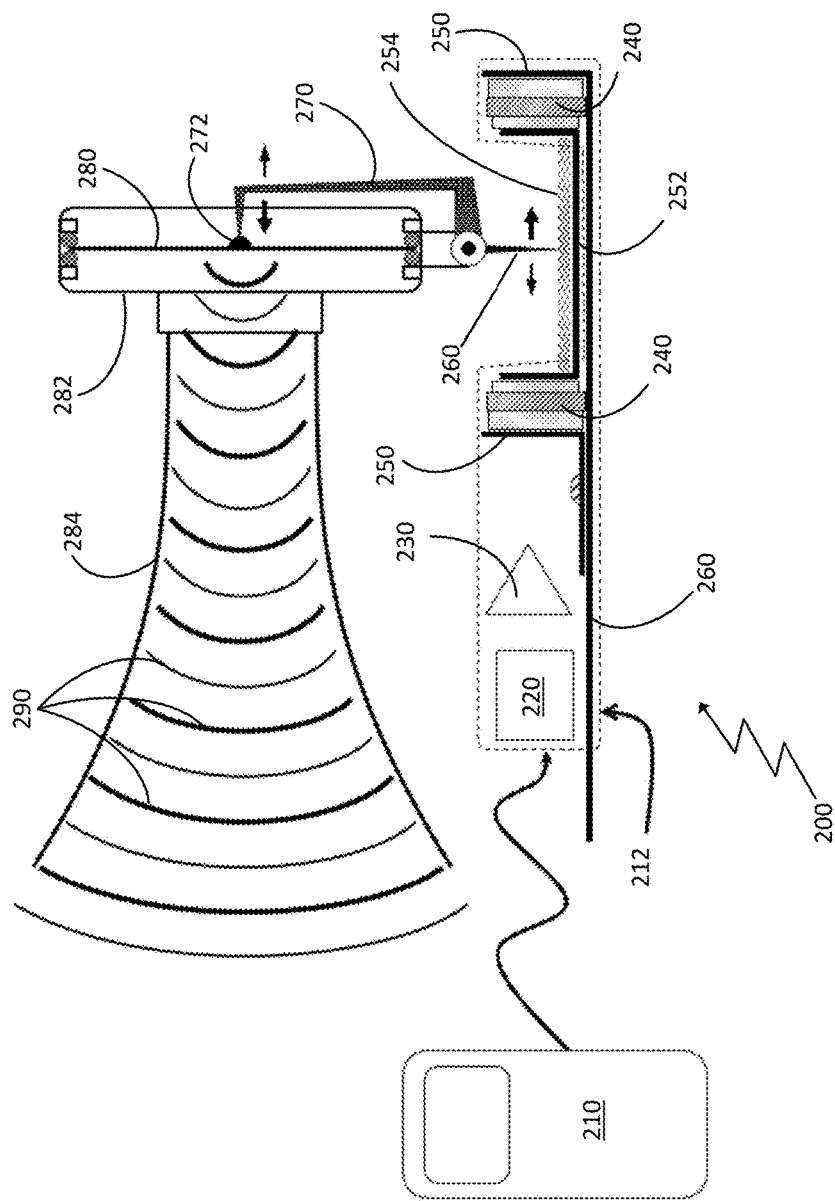
FIG. 4 provides schematic diagram of one embodiment of a system for playing sound on a gramophone.

FIG. 4 provides a schematic rendition of one set of embodiments in which a digital music player is capable of playing sound over a Victrola type gramophone. The analog line out from digital music player 210 carries a sound signal to conditioner 220 where the signal is conditioned, by, for example, combining a stereo signal into a monaural signal to be played over a monaural system employing a single stylus and horn. Power supply 212 provides power to amplifier 230 and any other components that require power. The conditioned signal is then amplified at amplifier 230 before it is fed to LMT 240. LMT 240 receives the amplified sound signal from amplifier 230 and converts the signal to translational movement. LMT 240 is mechanically coupled to carriage 252 which moves horizontally with a frequency and amplitude that tricks the stylus into acting like the stylus is being moved by the horizontal cuts in the grooves of a rotating record. As used herein, a part is mechanically connected to a second part if movement of the first part results in movement of the second part. Parts that are connected electrically for the purpose of transmitting electricity (charge or current) are not mechanically connected. For example, a power source connected to an amplifier is not mechanically connected even though physical wires may connect one to the other. Stylus 260 is gravity seated on stylus interface surface 254 of carriage 252 so that when carriage 252 moves, stylus 260 moves with it, as indicated by the opposing arrows surrounding the stylus 260. The force applied to carriage 252 by the stylus is provided by the weight of the sound box 282. With different systems, this mass can be greater than 50 g, greater than 100 g, greater than 150 g, less than 200 g, less than 150 g or less than 100 g. Carriage 252 may be made from a material that assures that the carriage moves in response to the movement of the LMT(s). For example, the carriage may be solid and stiff, and in many embodiments is not a membrane that may be flexed. In many embodiments, the carriage does not stretch and when the associated LMT moves, the carriage moves with the LMT without delay. The carriage may be comprised of, for example, polymer, ceramic, metal or alloys. The resulting vibration of stylus 260 is amplified by pivotally joined stylus bar 270 which is longer than the stylus and is affixed to diaphragm 280 at connection point 272. Sound box 282 can be airtight so that movement of diaphragm 280 results in alternating compression and expansion of the airspace on either side of the diaphragm. The resulting sound pressure waves 290 travel down amplifying horn 284 and can be heard as audible sound, such as music. The virtually unlimited library of digital music can be played on a gramophone where the unique and traditional tone of the Victrola horn is realized, free of hand cranks, motors, surface noise, mechanical noise, pops and clicks.

DETAILED DESCRIPTION

Several embodiments and components used with those embodiments are described below. Although specific devices and techniques are described, those of skill in the art will recognize that these devices and techniques can be extended to include any number of devices and techniques that can be employed to perform similar functionality.

In one set of embodiments, a system is provided that includes an LMT for converting sound signals to translational motion. The resulting movement is used to move the stylus as would the cuts in a record. Upstream amplifiers can be used to boost the sound signal to a level where the movement of the carriage is equivalent to, or greater than, the movement realized by the tip of the stylus when playing a record. Although groove size varies among types of records, a classic shellac 78 rpm record has about 100 grooves per inch with each v-shaped groove measuring about 0.006 inches across the top of the groove. A loud modulation is realized when playing a lateral bump in the groove of about 0.002 inches in either direction (about +/−50 µm). In many embodiments, the LMT, when fed an appropriate signal, can move the tip of the stylus by this amount, or more. For example, the LMT can provide horizontal deflection of the carriage, or the stylus tip, of greater than 10 µm, greater than 25 µm or greater than 50 µm. One, two or more LMTs can be combined to increase the range and strength of the lateral movement. For example, two LMTs can be positioned at opposite ends of the carriage and one may be wired antiphase so that the two LMTs cooperate in movement of the carriage.

Figure 5:
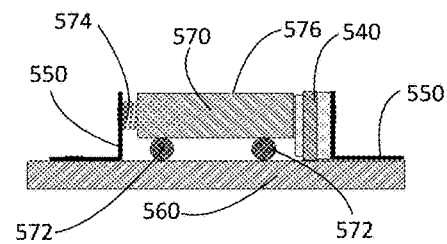
FIG. 5 provides a cross-section view of one embodiment of a modulation device.

FIG. 5 provides a cross-sectional view of an embodiment of a motion inducing device. As used herein, a motion inducing device includes an LMT as well as additional components that allow the LMT to be coupled with the stylus of the gramophone. For instance, a motion inducing device can include one or more of LMT 540, base 560, brackets 550, carriage 570 and electrical components such as conditioners, amplifiers, power sources, music sources and electrical connectors (not shown in FIG. 5). The embodiment illustrated includes a single LMT 540 that is fastened to base 560 via bracket 550. In this embodiment, LMT 540 is an audio exciter such as a TEAX14C02-8 electrodynamic transducer available from Tectonic Elements Ltd, Cambridgeshire, UK. Base 560 is stationary, so when LMT 540 is driven, it moves carriage 570 back and forth from right to left with a frequency and amplitude determined by the signal driving the LMT. Carriage 570 is supported by roller bearings 572 that allow the carriage to move left and right (as shown) in relation to base 560. Carriage 570 can be electrically grounded or can be isolated. Spring 574 is in compression and provides a bias to the system that moves the carriage to the right when LMT 540 retracts. The system is mounted on a gramophone so that the gramophone stylus can rest on the upper surface of carriage 570. As shown, carriage 570 includes indent 576 to retain the tip of the stylus on a fixed location on carriage 570. This allows the tip of a stylus to move with the lateral movement of carriage 570. In other embodiments, the indent may be any recess, such as an indent, groove, hole or depression. The lateral dimensions of the recess can be equal to, or slightly larger than the tip of a stylus. The contours of the recess may also be similar to those of the stylus, for example, the sides of the recess may be sloped at angles of about 30 or 45 degrees from vertical. In some embodiments the stylus may be affixed to the carriage or LMT while in other embodiments the stylus is in contact with the carriage or LMT but is not attached thereto and relies on gravity to maintain contact of the stylus with the moving surface. In other embodiments, the tip of the stylus may rest on the surface of the carriage but need not be retained by a groove or depression. In further embodiments, the carriage may be made of material that is soft enough for a steel or tungsten stylus to indent the surface when pressed into it. The resulting indent can help to retain the tip of the stylus at a single location on the surface of the carriage.

Figure 6A:
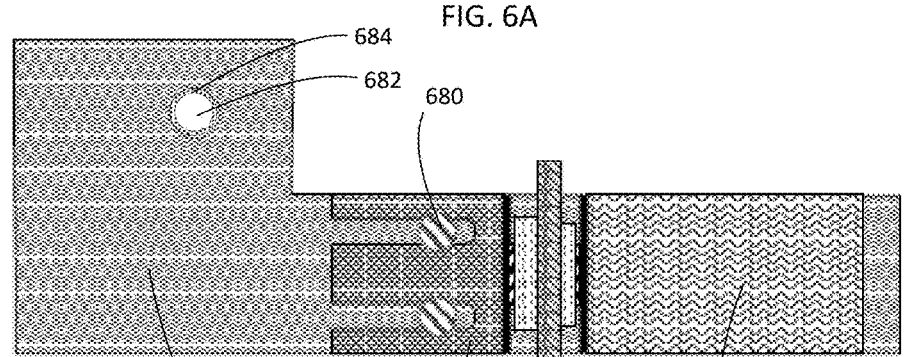
FIGS. 6A and 6B provide a top view and a profile view of an embodiment of a modulation device.
Figure 6B:
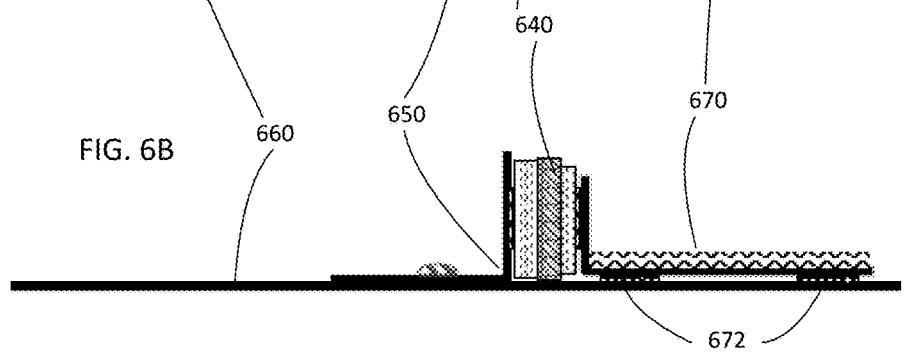

FIGS. 6A and 6B illustrate another embodiment of a motion inducing device that includes a single LMT, with FIG. 6A providing a top view and FIG. 6B providing a profile view. The LMT shown is a push-pull exciter 640, the housing of which is connected via bracket 650 and which is held to base 660 by screws 680. In some embodiments, one or more brackets 650 can be integral to base 660 and therefore do not require connectors to be mechanically joined. The opposing side of push-pull exciter 640 is attached to carriage 670 which is supported against gravity by slides 672 that may be, for example, PTFE or another low friction material. The upper surface of carriage 670 includes a series of grooves that are similar to those in a 78 record. When a gramophone stylus is place in one of these grooves, the tip of the stylus moves in sync with any lateral movement of the carriage. The push-pull exciter provides for right and left movement (as shown) of the carriage without the need for a biasing spring as in the embodiment shown in FIG. 5. Base 660 includes spindle hole 682 which is designed to receive the spindle at the center of the gramophone platter. Note that hole 682 is offset from carriage 670, allowing for better alignment of the stylus with the carriage. Other features may be included to aid in alignment such as, for example, a curved lip on the bottom surface of the motion inducing device for interfacing with the curved edge of a gramophone platter. Antique gramophone platters are typically either 9.75 inches or 11.75 inches in diameter and are designed to play 10 and 12 inch records respectively. Although base 660 can overhang the edge of the platter, the distance from the spindle hole 682 to the edge of base 660 can be less than 6 inches or less than 5 inches.

In some embodiments, spindle hole 682 may be secured to the spindle by spindle grommet 684. Spindle grommet 684 can help to reduce any movement between base 660 and spindle by providing a secure, tight fit around the spindle. In some cases, the base can move slightly on the platter, and the tight fit around the spindle can help reduce or eliminate this movement. The grommet may also help to insulate the base from any mechanical vibrations received through the spindle. Spindle grommet 684 can be made of any material that securely connects the base 660 to spindle. The spindle grommet may be circular and can be in the shape of a cylinder. The outer wall of the grommet may include a groove to receive the base 660. When the base 660 is removed from the spindle, the grommet may be affixed to the base 660 or may remain with the spindle. Suitable materials include, for example, polymers and pressed cellulosic products. In some embodiments, elastomeric polymers such as silicone, ethylene-vinyl acetate, polyethers, fluoroelastomers, fluorosilicones, natural rubbers and man-made rubbers can be used.

FIGS. 7A and 7B depict a top view and profile view, respectively, of a two LMT device that uses a second antiphase LMT to supplement movement of the carriage. Second LMT 742 is antiphase to first LMT 740 so that both LMTs move carriage 770 in the same direction on the same signal. Two LMTs at opposite ends of the carriage would fight against each other should they be wired in phase. Bracket 750 connects first LMT 740 to base 760 while bracket 752 does the same for second LMT 742. Supports 772 can be, for example, low friction slides to provide support to carriage 770, allowing the carriage to move laterally with the movement of the LMTs. Both first and second LMTs 740 and 742 can be push-pull LMTs so that each LMT can provide a force to move carriage 770 both left and right. In some embodiments, the resistance to lateral movement can be minimized by using, for example, low friction slides, low friction bearings, magnetic levitation, or a low resistance support such as micro fingers or a liquid, a suspension or a gel. Low friction slides include polymers such as PTFE and may include a lubricant layer, such as oil or graphite. A plurality of flexible vertical microfibers can support carriage 770 and can provide stability while allowing translational movement. A fluid, gel or suspension can also support the carriage without significantly reducing lateral movement at the distances required for sound reproduction. Supports 772 can provide for frictionless or low friction movement in the lateral direction but can be stationary or resistant to movement in the longitudinal direction, the traditional direction of groove passage under the stylus. In other embodiments, carriage 770 can be supported by the LMTs themselves and can be suspended there between.

In some cases, supports (e.g., slides) may offer some flexibility in the vertical direction to help reduce distortion. Although the sound reproduction may be completed primarily through lateral modulation, it has been found that in some cases there may be some resulting vertical movement to the carriage resulting in distortion, particularly at high volume. It is believed that this distortion may be caused by vertical vibration between the carriage and support. This distortion can be reduced or eliminated by using less rigid supports. The support can be of a material that doesn't simply compress but rather rebounds to provide some damping of repeated vibrations. The support material can absorb the vibrations while allowing the stylus and carriage to maintain contact. In various embodiments, with a vertical force of, e.g., 80 g, 100 g, 120 g or 140 g, the support may provide a vertical range of motion of greater than 0.0001 inch, greater than 0.001 inch, greater than 0.01 inch, less than 0.1 inch, less than 0.01 inch or less than 0.001 inch. For example, the support(s) can be made of nonwoven natural or synthetic felt or other soft material that absorbs vertical vibrations and is resilient. Examples of other support materials that can provide vibration damping include foam, rubber, gels and gas or liquid filled pillows.

As shown in FIGS. 7A and 7B, one or more LMTs can be connected to base 760 so that the stationary parts of the LMTs do not move in relation to the base, forcing the carriage 770 to move in relation to the base when the LMT(s) are excited. In other embodiments, one or more LMTs can be connected directly to a portion of the gramophone, for example, the platter, and a separate base may not be required. In yet other embodiments, the motion inducing device can be anchored in place by the gramophone spindle or may be massive enough that it does not move in response to movement of the LMT(s), transmitting all, or most, of the induced motion to the carriage.

FIG. 7C provides a circuit diagram of an electrical circuit that can be used in conjunction with the device of FIGS. 7A and 7B. Right and left stereo music inputs 732 and 734 are in electrical communication with the output of a digital music source. Conditioner 736 combines the two stereo inputs to a mono output for playing on a single horn gramophone. In other embodiments, stereo output can be maintained, and can be played through a gramophone with stereo capabilities or can be played through two gramophones simultaneously with each gramophone playing one of the stereo channels. Amplifier 738 amplifies the music signal to drive first exciter 740 and antiphase exciter 742. For example, the signal can be increased by 10, 20 or 30 dB. In many embodiments, the amplifier converts a high impedance "line level" signal into a low impedance drive signal without increasing signal voltage. The output of the amplifier may be controllable by the user, for example by adjusting a variable resistor. In many embodiments, the power being fed to the one or more LMTs is greater than 100 mW, greater than 500 mW or greater than 2 W. In some efficient systems, an amplifier may not be required and the output of the music device may be adequate to drive the LMT(s). Power for the amplifier can be drawn from the digital music player or from a separate power source that can be battery or mains sourced. In some cases, the inherent crank and wound spring system used for turning the platter on a gramophone can be converted to drive a small generator for providing power to the electronics (e.g., conditioner and/or amplifier) and even to the digital music player. The volume of the music emanating from the gramophone can be controlled traditionally, such as by closing or partially closing the cabinet doors to reduce the volume in the room.

FIGS. 8A and 9A depict a top down view of the same embodiment, with FIG. 8A illustrating a gramophone and FIG. 9A showing a motion inducing device 600 positioned on the gramophone 800. FIGS. 8B and 9B both provide a profile view of the soundbox of FIGS. 8A and 9A. Gramophone 800 includes cabinet 802 that houses and supports the working parts, including horn 880 which is positioned inside cabinet 802. Platter (turntable) 896 and spindle 892 are supported in the standard method, but need not be connected to or driven by the motor. Brake 804 can be applied to avoid rotation of the platter. Stylus 830 includes stylus touch point 832 where traditionally the stylus would contact the record groove. As shown in FIG. 9A, touch point 832 is in contact with the carriage of motion inducing device 600. Stylus 830 is retained with a set screw and is attached to stylus bar 840 on soundbox 860. Diaphragm 850 may be of conventional material, such as mica, and is retained between two gaskets (not shown) in the soundbox. Diaphragm 850 divides soundbox 860 into two air spaces with one of the air spaces in fluid communication with soundbox tube 872, taper tube 874 and horn 880.

As shown in FIG. 9A, the motion inducing device 600 is seated on platter 896 and is pivotally attached to spindle 892 via a spindle sized orifice in the motion inducing device. In some cases, the platter can be removed and the motion inducing device can be mounted to the cabinet or on an alternative portion of the gramophone. Dotted line 814 represents a radius passing from the center of the platter and beneath the center of the soundbox. The offset base of motion inducing device 600 shifts the point of stylus contact downward (as shown) in the direction in which a record would spin, from the radius that passes under the center of the soundbox. When a gramophone is playing a rotating record, it is important that the stylus be angled, in the direction of record rotation, as shown in FIGS. 8B and 9B. User manuals suggest that when contacting the record groove, the stylus be at a 45° angle. Although this is important to reduce wear of the record, it is not the best geometry for most efficiently translating lateral cuts in the record into diaphragm movement. In theory, the most efficient transfer of sound from a record through the stylus to the diaphragm is when the stylus is perpendicular to the tangent of the groove in which the stylus is placed. With the implementation of the motion inducing devices described herein, the soundbox and stylus can be positioned in a more efficient geometry because, for example, there is no rotating record, no stylus wear on the carriage and little or no wear on the stylus itself.

As shown in FIG. 9A, motion inducing device 600 can be consistently and repeatedly placed in the same position by sliding the motion inducing device onto the spindle 892. The motion inducing device, pivotally attached to spindle 892, can be horizontally rotated until the center of the carriage is directly under the stylus 830 when stylus point of contact 832 is resting on carriage 894. When excited, the LMT vibrates back and forth along axis 812. The axis of movement 812 can be perpendicular to, or substantially perpendicular to, a plane defined by diaphragm 850 and perpendicular to the axis of the stylus. In some embodiments, viewing along the axis of movement of the carriage, the angle between the axis of the stylus and the carriage surface, or the axis of movement of the carriage, can be about 90°, between 40° and 90°, between 80° and 90°, between 70° and 90°, between 60° and 90°, between 50° and 90°, between 70° and 80° or between 60° and 70°. This angle is illustrated as ß in FIG. 10B which provides a profile view of the system shown from above in FIG. 9A. The angle that the stylus makes with the carriage surface from the point of view taken looking along the tangent of an imaginary record groove in contact with the stylus is, in many embodiments, within a few degrees of vertical. This is illustrated in FIG. 10A which, for explanatory purposes, shows exaggerated motion and is not-to-scale.

Figure 10A:
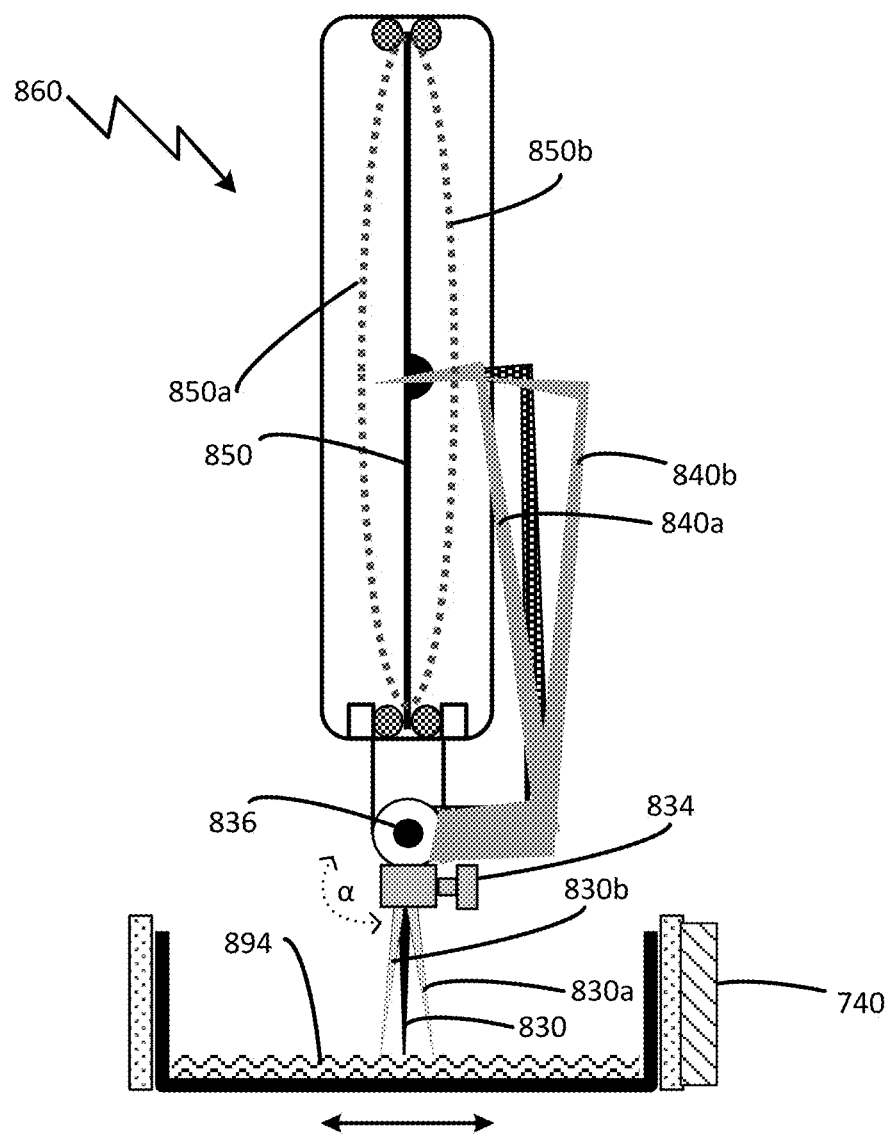
FIG. 10A provides a cutaway view of a sound box and stylus in contact with a carriage of one of the embodiments described herein.

FIG. 10A provides a view of a cross section through sound box 860 taken in the plane at the position of the stylus. The line of sight of FIG. 10A is along the tangent of a groove from an imaginary record that the stylus is riding in on the gramophone. Stylus 830 is in contact with carriage 894 and when carriage 894 is moved left and right by LMTs 740, the tip of stylus 830 moves with the carriage, changing the angle α of the stylus in relation to the sound box, or in relation to the vertical axis. In many older gramophone designs, the length from the tip of stylus 830 to the stylus pivot point 836 is about 0.8 inches. As the stylus is moved back and forth by the lateral movement of the carriage, the stylus pivots and the stylus tip moves to positions 830a and 830 b (exaggerated as shown), and a can change by greater than 0.05 degree, greater than 0.10 degree or greater than 0.15 degree. The movement of the angle of the stylus may also be less than 0.3 degree, less than 0.2 degree or less than 0.1 degree. The stylus is mechanically linked to stylus bar 840 which is mechanically linked to diaphragm 850. The stylus bar 840 is moved between positions 840a and 840b which in turn extends diaphragm 850 between positions 850a and 850b. Diaphragm 850 moves the air in the soundbox and produces sound waves that are transmitted via the air in the sound arm and the sound horn. The sound waves that are produced are a reproduction of the sound signal that is transmitted to the LMT(s). The gramophone and motion inducing device may be capable of replicating sounds outside the frequency range of the human ear or outside of the range obtainable when playing a 78 rpm record. When playing records, most antique gramophones have a frequency range of about 100 Hz to about 8000 Hz. The system described herein, however, using the same device from the stylus to the horn, can reproduce frequencies as low as 20 Hz or as high as 20,000 Hz. Obtainable frequency ranges include, for example, 100 Hz to 10,000 Hz, 50 Hz to 10,000 Hz, 50 Hz to 15,000 Hz or 20 Hz to 20,000 Hz. While the movement of the stylus may be similar to that induced by playing a record, the LMTs may be capable of moving the stylus more distinctly, over a greater distance and at a greater frequency than the movement that is achieved using a recording, such as a 78 rpm shellac record.

Figure 10B:
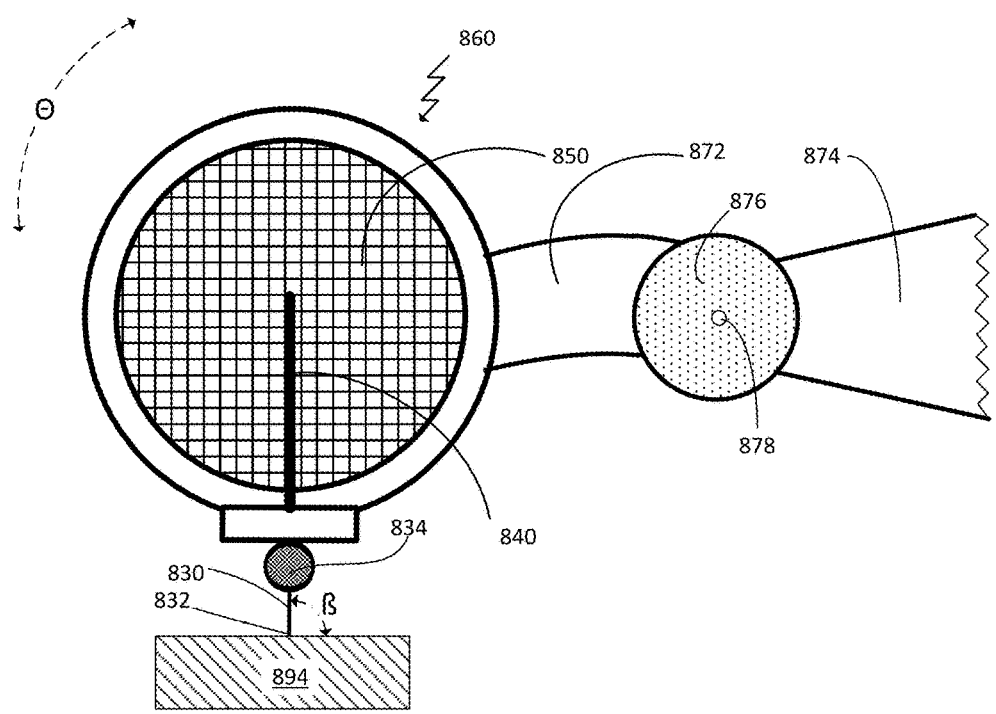
FIG. 10B provides a profile view of the embodiment of FIG. 10A along a line of sight 90° from the line of sight of FIG. 10A.

As viewed in FIG. 10B, lateral movement of carriage 894 occurs into and out of the page. As shown, stylus 830 is held in place by conventional set screw 834 and is in contact with carriage 894 at point of contact 832. Lateral movement of stylus 830 is exaggerated by stylus bar 840 which is mechanically connected to diaphragm 850 which in turn is supported between gaskets in sound box 860. Sound waves pass out of sound box 860 through sound box tube 872, through pivoting connector 876 and into taper tube 874. Sound box 860 is pivotable in a vertical axis around pivot point 878 and this movement can be used to place and remove the stylus from the carriage 894, as it would be for a record. Angle Θ illustrates the angle formed by the movement of sound box 860 around pivot point 878 and is a result of the vertical distance between the upper surface of carriage 894 and pivot point 878, as well as the height of the sound box 860, including stylus 830. If a particular embodiment of the motion inducing device is too high, resulting in a decreased Θ and a resulting decrease in angle ß, the platter (turntable) can be removed from the gramophone to provide additional vertical space. In other embodiments, the motion inducing device is designed to be of a low profile, and from the bottom surface of the LMT (in contact with the platter) to the point of contact 832 on the upper surface of carriage 894 may be, for example, less than 1 cm, less than 7 mm, less than 5 mm or less than 3 mm. These embodiments allow for the playing of digitally stored music while still allowing for, with removal of the motion inducing device, the playing of conventional records on the gramophone.

While various gramophone designs may differ in componentry, most mechanisms are similar in that the stylus is mechanically connected to the diaphragm so that movement of the stylus directly and mechanically moves the diaphragm to produce sound waves that travel along an air pathway to the horn. No electrical input or amplification is needed along the pathway from the stylus to the horn. Different geometries of the pathway, including tubes and horn, help determine the qualities of the sound, and thus different designs can be chosen to achieve different results. As some LMT embodiments may offer greater dynamic range than does a shellac or vinyl record, gramophone geometries may also be altered to improve sound qualities given this greater range.

EXAMPLE

In one exemplary embodiment, a manually powered gramophone such as that shown in FIG. 8A is equipped with the dual anti-phase LMT system as illustrated in FIGS. 4 and 9A. A source of music (or other sound), such as digital music storage device 210, is in electrical communication with motion inducing system 200 which, in this embodiment, includes LMT(s) 240, carriage 252, brackets 250, amplifier 230 and conditioner 220. The motion inducing system 200 may include a wireless receiver and/or transmitter, such as Bluetooth or wifi, for receiving or transmitting sound and/or meta data. In other embodiments, the motion inducing system may include a sound input port such as a standard audio jack and/or may include an on board radio receiver and tuner, such as an FM tuner. Some motion inducing systems may include on board digital music storage that may be dedicated to the motion inducing device. The on board digital music storage device can also include a power supply, data storage, removable data storage, wifi capability and/or a visual display. Additional improvements to the system may include replacing the mica diaphragm with more modern materials such as flexible polymers, composite or carbon fiber laminates or carbon nanotube sheets. These changes to the diaphragm may improve, for example, robustness, sound quality and volume.

Any source of sound can be transmitted from the sound source to optional conditioner 220 where stereo signals can be combined into a monaural signal. Conditioner 220 can provide other functions such as filtering, isolating, amplifying or digital to analog conversion. In some embodiments, conditioner 220 can comprise at least one of a filter, an isolator, an amplifier or a digital to analog or analog to digital converter. From conditioner 220, the signal travels to amplifier 230 where the power of the signal is increased to a level that is adequate to drive the LMT(s). This power level can be adjusted by the user or, in some cases, is fixed. The power level can be optimized by listening to music being played over the system and detecting when desirable volume and range is obtained absent undesirable distortion or background noise. Different types of sound, for instance, different music types, voice, movie soundtracks or news broadcasts may provide for best results at different power levels that may be best determined on location on a case by case basis.

The electrical signal from the amplifier is used to drive LMTs 240 that are mechanically connected to carriage 252. As shown they are wired anti-phase and are physically positioned as mirror images of each other, facing inwardly. As a result, each LMT moves the carriage in the same transverse direction upon receiving the same signal. As shown in the embodiment of FIG. 4, the LMTs can be exciters such as compact audio exciter TEAX14C02-8 available from Tectonic Elements Ltd. Carriage 252 is moved by the LMTs along a single axis at a frequency and amplitude that is similar to that which would be provided by a laterally cut record passing under the stylus. The carriage and the LMT(s) may be the only portions of the motion inducing system that move in relation to the gramophone. The axis or plane of the carriage may be oriented in a direction that is substantially normal to the axis of movement of the exciters. Stylus 260 contacts carriage surface 254 at a contact point, and the tip of the stylus moves along with the movement of the carriage. These lateral stylus movements are amplified by the long lever of stylus bar 270. The stylus bar is mechanically attached to diaphragm 280 which vibrates in response to the stylus movement. Vibration of diaphragm 280 causes air waves to develop, and sound waves are created in response to the sound signal from the digital music source. The carriage moves little or no air but may still produce some sound itself, as much as can be heard directly from the diaphragm. Full range and volume sound is reproduced when the sound produced by the diaphragm is mechanically amplified by the design of the taper tube assembly and horn. The diaphragm is moved by the stylus bar which is mechanically connected to the stylus which is vibrated by the movement of the carriage.

While several embodiments have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of this disclosure. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of this disclosure is/are used. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, along with other embodiments that may not be specifically described and claimed.

All definitions, as defined herein either explicitly or implicitly through use should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified, unless clearly indicated to the contrary.

What is claimed is:

1. A device for playing sound, the device comprising:
   at least one transducer configured to receive an audio input from an electronic source and convert the audio input into linear motion; and
   a soundbox coupled to the transducer and including a diaphragm, the diaphragm mechanically connected to the transducer, and wherein linear motion of the transducer moves the diaphragm to produce at least one sound wave in response to receipt of the audio input.

2. The device of claim 1, wherein the at least one transducer is one of a linear motor, a linear actuator, a modulator, and an exciter.

3. The device of claim 1 further comprising an arm operatively coupled to the transducer and the soundbox, the arm configured to push and/or pull the diaphragm to produce the at least one sound wave.

4. The device of claim 3, wherein the arm is affixed to the diaphragm of the soundbox.

5. The device of claim 3, wherein the arm pivotally joins the soundbox to the transducer.

6. The device of claim 1, wherein the electronic source is one of a microphone, a radio, a television, and an online audio feed.

7. The device of claim 1, wherein the electronic source is one of streaming data or stored audio data.

8. The device of claim 1, wherein the soundbox includes an airtight portion, such that movement of the diaphragm within the soundbox causes compression and expansion of airspace on either side of the diaphragm.

9. The device of claim 8, wherein compression and expansion of the airspace on either side of the diaphragm is done in an alternating fashion.

10. The device of claim 1, wherein the diaphragm is supported between at least two gaskets of the soundbox.

11. The device of claim 1, wherein the diaphragm is constructed and arranged within the soundbox so that the soundbox includes at least two air spaces.

12. The device of claim 11, wherein one of the air spaces being in fluid communication with a soundbox tube, a taper tube, and a horn.

13. The device of claim 1 further comprising an electrical circuit constructed and arranged to receive the audio input from the electronic source and provide the audio input to the transducer.

14. The device of claim 1 further comprising a digital storage device, the digital storage device being the electronic source of the audio input.

15. A system for playing sound, the system comprising:
   an electronic sound source configured to provide an audio input;
   a motion inducing device in communication with the electronic sound source, the motion inducing device including
      an electrical circuit constructed and arranged to receive the audio input from the electronic sound source, and
      at least one transducer configured to receive the audio input from the electrical circuit and convert the audio input into linear motion; and
   a soundbox coupled to the motion inducing device and including a diaphragm, the diaphragm mechanically connected to the transducer, and wherein linear motion of the transducer moves the diaphragm to produce at least one sound wave in response to receipt of the audio input from the electronic sound source.

16. The device of claim 15, wherein the electrical circuit further comprises an input, the input being in electrical communication with an output of the electronic sound source.

17. The device of claim 15, wherein the electrical circuit is configured to modify the audio input so as to provide a modified audio input to the at least one transducer.

18. The device of claim 15, wherein the motion inducing device is a linear motor transducer.

19. The device of claim 15, wherein the electrical circuit further comprises at least one of a conditioner and an amplifier to modify the audio input from the electronic sound source.

20. The device of claim 19, wherein the conditioner is configured to combine at least two audio inputs to provide a mono output.

* * * * *